United States Patent
Murry

(10) Patent No.: US 8,406,631 B2
(45) Date of Patent: Mar. 26, 2013

(54) NETWORK TIMING

(75) Inventor: Stefan J. Murry, Houston, TX (US)

(73) Assignee: Applied Optoelectronics, Inc., Sugar Land, TX (US)

( * ) Notice: Subject to any disclaimer, the term of this patent is extended or adjusted under 35 U.S.C. 154(b) by 901 days.

(21) Appl. No.: 12/140,134

(22) Filed: Jun. 16, 2008

(65) Prior Publication Data

US 2009/0310970 A1    Dec. 17, 2009

(51) Int. Cl.
*H04J 14/08* (2006.01)

(52) U.S. Cl. ............ 398/98; 398/154; 398/155; 398/99; 398/100; 398/72; 398/75; 398/66; 398/68; 370/503; 370/328; 370/468; 370/395.42; 370/352

(58) Field of Classification Search .............. 398/82, 398/83, 58, 63, 67, 68, 71, 72, 86, 155, 154, 398/168–170, 98, 99, 100, 101, 102, 66, 398/75; 370/503, 328, 468, 352, 392, 389, 370/395.42, 432, 351

See application file for complete search history.

(56) References Cited

U.S. PATENT DOCUMENTS

| | | | |
|---|---|---|---|
| 5,726,784 A * | 3/1998 | Alexander et al. | 398/91 |
| 6,684,031 B1 * | 1/2004 | Kogelnik et al. | 398/99 |
| 7,536,104 B2 * | 5/2009 | Dotaro et al. | 398/58 |
| 2002/0021464 A1 * | 2/2002 | Way | 359/124 |
| 2002/0063924 A1 * | 5/2002 | Kimbrough et al. | 359/125 |
| 2003/0063843 A1 * | 4/2003 | Horne | 385/24 |
| 2004/0013360 A1 * | 1/2004 | Smets | 385/31 |
| 2005/0078958 A1 * | 4/2005 | Chae et al. | 398/41 |
| 2005/0283815 A1 * | 12/2005 | Brooks et al. | 725/126 |

* cited by examiner

*Primary Examiner* — Hanh Phan

(74) *Attorney, Agent, or Firm* — Berkeley Law & Technology Group, LLP; Norman S. Kinsella

(57) ABSTRACT

The subject matter disclosed herein relates to synchronizing network timing. In one particular example, network timing may be synchronized using reflected signals.

20 Claims, 4 Drawing Sheets

NETWORK TIMING

BACKGROUND

1. Field

The subject matter disclosed herein relates to synchronizing timing on a network.

2. Information

A network may include a type of optical network whereby multiple optical network terminals (ONT's) may be connected to a single optical line termination (OLT) via a network of one or more optical splitters and optical fiber, for example. One such optical network may include a passive optical network (PON), which does not comprise active components Generally, a PON may include an OLT that may transmit a signal downstream to multiple ONT's, which may comprise end-users such as households and/or businesses on a network. Such an ONT may be configured, for example, to continuously receive downstream signals from the OLT while transmitting upstream signals during an allocated time slot. For example, individual ONT's may be assigned particular time slots during a network initialization and/or configuration. Using such time slots, upstream signals from multiple ONT's on the PON may be coordinated with one another to reduce collisions between the upstream signals, for example. Such an upstream signal from an ONT may include a request intended for an OLT, for example. Such requests may be cached by the requesting ONT while the ONT's time slot is not active.

Downstream signals from an OLT may include a semi-regular pattern of encoded digital ones and zeroes that may allow synchronization of internal clocks in multiple ONT's, which may all receive the same downstream signal. In some applications, however, such downstream signals may not include such a digital signal, but instead may include a format encoded as an analog signal, such as an analog video signal for example. In such applications, a downstream signal to multiple ONT's may not include a semi-regular digital pattern with which to synchronize internal clocks in the multiple ONT's. Accordingly, lacking a way to synchronize their internal clocks, ONT's may fail to accurately track their respective allocated time slot, leading to collisions among different upstream ONT requests.

BRIEF DESCRIPTION OF THE FIGURES

Non-limiting and non-exhaustive embodiments will be described with reference to the following figures, wherein like reference numerals refer to like parts throughout the various figures unless otherwise specified.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components, and/or circuits have not been described in detail so as not to obscure claimed subject matter.

Reference throughout this specification to "one embodiment" or "an embodiment" means that a particular feature, structure, or characteristic described in connection with an embodiment is included in at least one embodiment of claimed subject matter. Thus, appearances of the phrase "in one embodiment" or "an embodiment" in various places throughout this specification are not necessarily all referring to the same embodiment. Furthermore, the particular features, structures, or characteristics may be combined in one or more embodiments.

Figure 1:
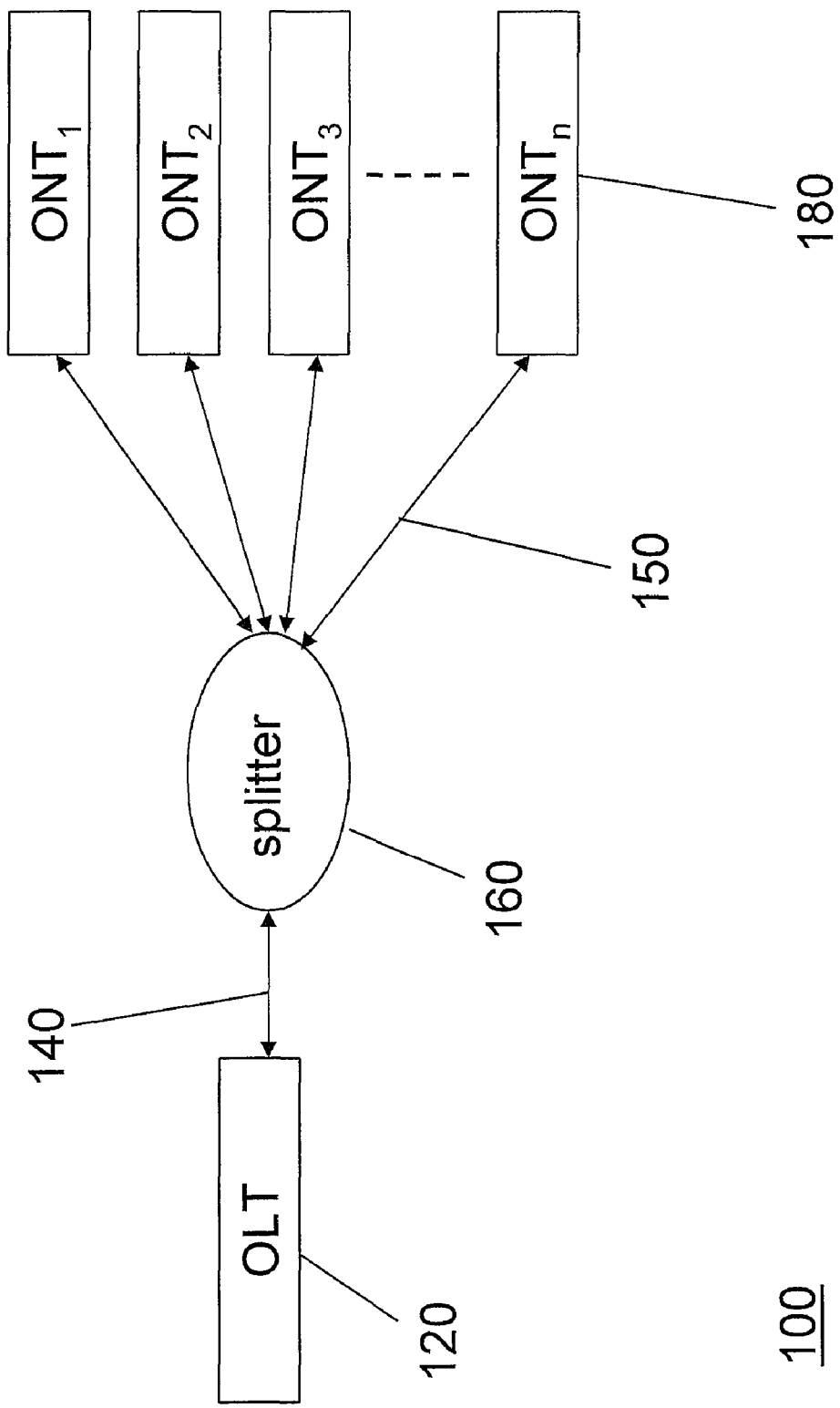
FIG. 1 is a schematic diagram illustrating an optical network, according to an embodiment.

Embodiments described herein relate to, among other things, synchronizing network elements using reflected signals from the network elements. In one particular embodiment, although claimed subject matter is not limited in this respect, an optical network 100, as shown in FIG. 1, may include multiple optical network elements, such as optical network terminals (ONT's) 180 connected to a single optical line termination (OLT) 120 via an optical splitter 160 and transmission paths 140 and 150, for example. In one implementation, such an optical network may include a passive optical network (PON), which does not comprise active components, such as an optical amplifier, for example. In another implementation, such an optical network may include an active optical network, which may comprise one or more active components. Although embodiments including optical networks are described herein in the Specification, such embodiments are not so limited, and may include non-optical networks that use electrical signals, for example.

In a particular embodiment, OLT 120 may be configured to transmit analog and/or digital optical signals at a first wavelength, such as a nominal wavelength of about 1550 nm, for example, and ONT 180 may be configured to receive such signals. Further, ONT 180 may be configured to transmit analog and/or digital optical signals at the first wavelength and/or second wavelength, such as a nominal wavelength of about 1310 nm, which may be different than the first wavelength at which ONT 180 receives signals, though claimed subject matter is not limited to such configurations. In the context of the present and other embodiments described herein, first and second wavelengths may deviate from the stated values. For example, OLT and ONT temperatures, details of manufacture, and optical bandwidth may affect the first and second wavelengths. Accordingly, wavelength values stated herein and in the claimed subject matter may be qualified by terms such as "nominal" and "about".

Figure 2:
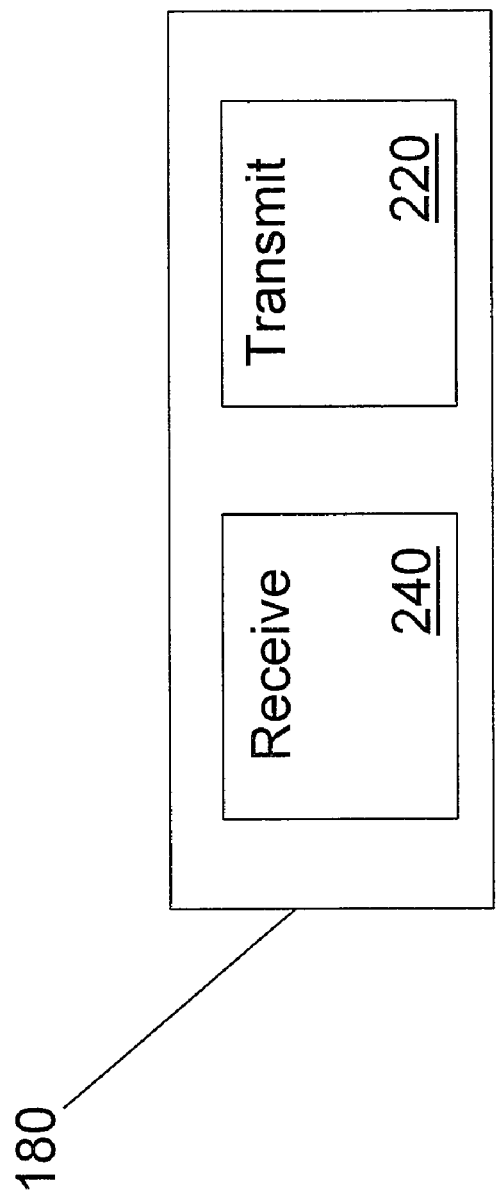
FIG. 2 is a schematic diagram illustrating an optical network terminal, according to an embodiment.

In a particular embodiment, ONT 180 may include a transmit device 220 and a receive device 240, as shown in FIG. 2, for example. Transmit device 220 may comprise a laser diode, a light emitting diode, and/or other such photo-emitting element, for example. Receive device 240 may comprise a photodiode, an avalanche photodiode, and/or other such photo-detecting element, for example. Transmit device 220 may be configured to transmit a signal to OLT 120 via optical splitter 160, for example. In one particular implementation, transmit device 220 may be configured to transmit burst-mode digital signals at a nominal 1310 nm, and receive device 240 may be configured to receive digital and/or analog signals at both a nominal 1550 nm and 1310 nm. For example, receive device 240 may include a first optical receiver to detect signals of a first wavelength, such as nominal 1550 nm analog signals from OLT 120, and a second optical receiver to detect signals of a second wavelength, such as nominal 1310 nm digital signals from one or more other ONT's 180, as described below. In a particular implementation, such a first and second optical receiver may be part of a single device. For example, a single optical receiver may be used to detect light from two different optical paths, each using different optical filters to carry different wavelengths of light.

In an embodiment, OLT 120 may transmit a signal to multiple ONT's 180, which may comprise end-user equipment located at households and/or businesses on an optical network, for example. Such ONT's may be configured, for example, to receive signals from OLT 120 and transmit signals over transmission path 150 during a particular time slot allocated to individual ONT's. Such particular time slots may be assigned to respective ONT's 180 during a network initialization and/or configuration, for example. Using such particular time slots, signals from multiple ONT's 180 may be coordinated with one another to reduce the incidence of collisions between signals occurring at the same time, for example. Instead, individual ONT's may be allocated a defined time slot for transmitting signals onto a network. Individual ONT's, such as $ONT_1$ and $ONT_2$ shown in FIG. 1, may include an internal clock (not shown) to provide timing to allow the ONT's to track their respective time slot. Such internal clocks of multiple ONT's may be synchronized with respect to one another to compensate for any possible differences in time-keeping accuracy. For example, if an internal clock in one ONT drifted with respect to an internal clock in another ONT, then the respective time slots of the two ONT's may adversely overlap, possibly resulting in a signal collision. Embodiments directed to synchronizing such internal clocks of multiple ONT's are described below. Of course, claimed subject matter is not limited to these or any embodiments described herein.

In an embodiment, a portion of a signal from an ONT may be reflected on its way to an OLT, for example. Herein, the term "portion" may refer to a portion of a total amount of light and/or energy that represents an optical signal. For example, a first portion of an optical signal may transmit through an optical element, such as an optical filter, while a second portion may reflect from the optical element. The second, reflected portion may be much smaller than the first transmitted portion. Such a reflected signal portion may be received by multiple ONT's, and may include timing information of the transmitting ONT. Such timing information may include, for example, a clock signal used by the transmitting ONT to modulate the signal, a beginning and end time of the signal, and/or one or more timing symbols included in the signal, just to name a few examples. Of course, claimed subject matter is not limited to such examples. Such timing information may be used by multiple ONT's to synchronize the ONT's with respect to one another, as explain below.

In one implementation, such a reflection, as described above, may be produced at a splitter, such as splitter 160 as shown in FIG. 1, for example. Any of a number of optical elements included in a splitter, for example, may naturally reflect a portion of an optical signal that is transmitted through it. Though such reflected portions of an optical signal may be small, they may be large enough to be received and detected by multiple ONT's. In another implementation, a splitter, such as splitter 160 as shown in FIG. 1 for example, may be modified to introduce a particular reflected portion of a signal. Such a modification may include adding a reflection coating to an optical element of a splitter, adding an element to a splitter, and/or adjusting various coupling parameters between a splitter and optical fiber transmission lines, just to list a few examples. In an alternative embodiment, a reflection may be introduced in an optical network by adding a reflecting element, such as an optically-coated window or an optical index discontinuity among optical fiber transmission lines, just to list a few examples.

Figure 3:
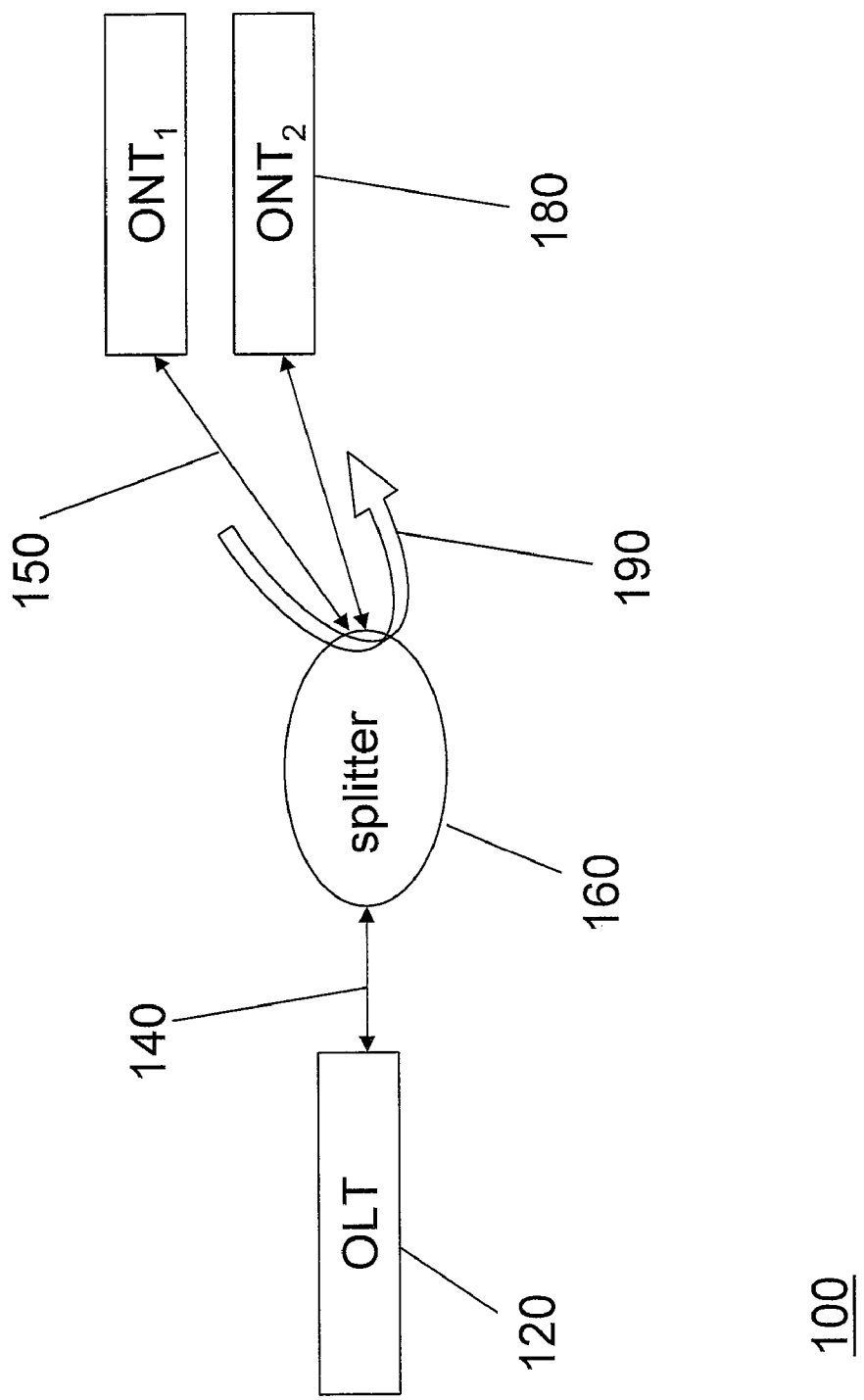
FIG. 3 is a schematic diagram illustrating an optical network and a reflected signal, according to an embodiment.

FIG. 3 is a schematic diagram illustrating an optical network and a reflected signal, according to an embodiment. In a particular example, $ONT_1$ transmits a signal over transmission path 150. Though a substantial portion of such a signal may reach its destination, which may be OLT 120 for example, a portion of the signal may be reflected, as represented by an arrow 190 in FIG. 3. Such a reflection may occur at splitter 160 or other portion of network 100, as discussed above. Subsequent to reflection, $ONT_2$ may receive a reflected portion of a signal transmitted by $ONT_1$. Though not shown in the present example, multiple ONT's 180 may also receive a reflected portion of a signal transmitted by $ONT_1$.

In one embodiment, a receiver, such as receive device 240 shown in FIG. 2, may receive an optical signal 190 reflected from an optical network element, such as splitter 160 shown in FIG. 3, for example. A transmitter, such as transmit device 220 shown in FIG. 2, may transmit an optical signal in an upstream direction, such as towards OLT 120, as discussed above. A clock (not shown) may determine transmission times of the transmitted optical signal. An ONT, for example, may comprise such a clock, which may be synchronized based, at least in part, upon received optical signal 190.

Figure 4:
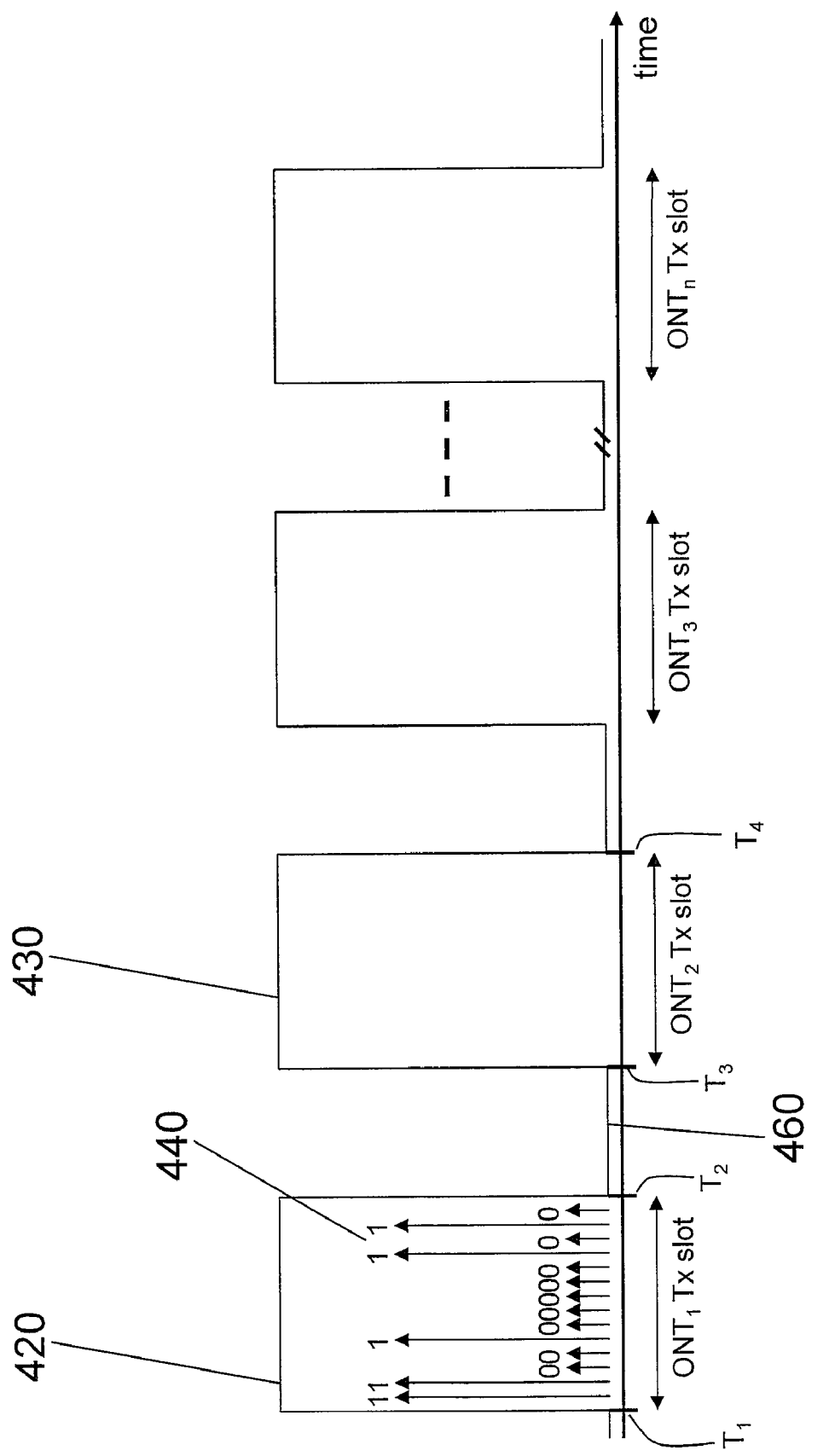
FIG. 4 is a schematic diagram illustrating transmission time slots for individual optical network terminals, according to an embodiment.

FIG. 4 is a schematic diagram illustrating transmission time slots for individual optical network terminals, such as ONT's 180 shown in FIG. 1 for example, according to an embodiment. As mentioned above, such time slots may be allocated to particular ONT's for receiving and/or transmitting signals from/to a network. For example, $ONT_1$ may send or receive a signal during its time slot 420 beginning at time $T_1$ and ending at time $T_2$, $ONT_2$ may send or receive a signal during its time slot 430 beginning at time $T_3$ and ending at time $T_4$, and so on. In an embodiment, time period 460 between time slots 420 and 430 may include guard bands, for example, during which ONT communication may not be allowed. FIG. 4 schematically shows an example digital signal 440 transmitted by $ONT_1$, comprising digital ones and zeroes at a particular clock frequency, which may be a frequency of the internal clock for $ONT_1$. Other ONT's may or may not transmit such a digital signal, which is not shown for ONT's other than $ONT_1$ in the figure for the sake of clarity. As discussed above, a portion of digital signal 440 transmitted onto a network by $ONT_1$ may be reflected by an element included in the network. Such a reflected portion may be received and detected by multiple ONT's, such as $ONT_2$, $ONT_3$, and so on. In an embodiment, an ONT may be configured to measure the particular clock frequency inherent in reflected digital signal 440, and use such a measurement to synchronize its internal clock, as mentioned above. In another embodiment, an ONT may be configured to count clock pulses of the modulated digital signal 440 on $ONT_1$ and use such a count to determine when its time slot begins and ends. Such a determination may be made by multiple ONT's periodically, in a round-robin fashion, for example. Accordingly, ONT's may synchronize their internal clock with one another based on measured clock frequencies of multiple ONT's on a periodic basis, which may ensure relatively accurate long-term synchronization of a network. Such synchronization may be performed by timer logic that may be included in one or more ONT's, for example. In one implementation, timer logic may include an ONT's internal clock.

Accordingly, network elements, consistent with the embodiments described herein, may be synchronized with one another based on a reflected signal from one or more of the network elements.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended claims, and equivalents thereof.

What is claimed is:

1. A method comprising:
   receiving, at a first optical network element, at least a portion of a signal reflected at a second optical network element, at least a portion of said reflected signal originating from a third optical network element;
   measuring a frequency of said reflected signal; and
   synchronizing frequencies of clocks of said first, second, and third optical network elements based, at least in part, upon said measured frequency of said reflected signal.

2. The method of claim 1, wherein said third optical network element includes a first optical network termination (ONT).

3. The method of claim 2, wherein said first optical network element includes a second ONT.

4. The method of claim 1, wherein said second optical network element includes a passive optical element.

5. The method of claim 1, further comprising:
   adding an optical element to said second optical network element to affect reflectivity of signals transmitted by said third optical network element.

6. The method of claim 1, wherein said first optical network element includes a first optical receiver to detect a first signal at a first wavelength, a second optical receiver to detect said reflected signal at a second wavelength, and an optical transmitter to emit a second signal at said second wavelength.

7. The method of claim 6, wherein said first wavelength is about 1550 nm and said second wavelength is about 1310 nm.

8. A device comprising:
   a first receiver to receive and to measure a frequency of a first optical signal reflected from a reflecting optical network element;
   a transmitter of a transmitting optical network element to transmit a second optical signal in a direction towards said reflecting optical network element; and
   a clock of said reflecting optical network element to determine transmission times of said transmitted optical signal, wherein said clock of said reflecting optical network element is synchronized with a clock of said transmitting optical network element based, at least in part, upon said frequency of said received first optical signal.

9. The device of claim 8, further comprising a second receiver to receive a third optical signal, wherein said first receiver is adapted to detect said first optical signal at a first wavelength, said second receiver is adapted to detect said third optical signal at a second wavelength, and said transmitter is adapted to emit said second optical signal at said first wavelength.

10. The device of claim 9, wherein said first wavelength is about 1310 nm and said second wavelength is about 1550 nm.

11. The device of claim 9, wherein said first and third optical signals include an analog optical signal.

12. The device of claim 8, wherein said device includes a first optical network termination (ONT).

13. The device of claim 8, further comprising an optical window between said first receiver and said reflecting optical network element, said optical window to produce at least a portion of said received first optical signal.

14. The device of claim 8, further comprising an optical index discontinuity between said first receiver and said reflecting optical network element, said optical index discontinuity to produce at least a portion of said received first optical signal.

15. An apparatus comprising:
   means for receiving, at a first optical network element, at least a portion of a signal reflected at a second optical network element, at least a portion of said reflected signal originating from a third optical network element;
   measuring a frequency of said reflected signal; and
   means for synchronizing frequencies of clocks of said first, second, and third optical network elements based, at least in part, upon said measured frequency of said first reflected signal.

16. The apparatus of claim 15, wherein said third optical network element includes a first optical network termination (ONT).

17. The apparatus of claim 16, wherein said first optical network element includes a second ONT.

18. The apparatus of claim 15, further comprising:
   means for adding an optical element to said second optical network element to affect reflectivity of signals transmitted by said third optical network element.

19. The apparatus of claim 15, wherein said first optical network element includes a first optical receiver to detect a first signal at a first wavelength, a second optical receiver to detect said reflected signal at a second wavelength, and an optical transmitter to emit a second signal at said second wavelength.

20. The apparatus of claim 19, wherein said first wavelength is about 1550 nm and said second wavelength is about 1310 nm.

* * * * *